United States Patent

[11] 3,595,220

| [72] | Inventor | Tenizo Kawahara |
| --- | --- | --- |
| | | Tokyo, Japan |
| [21] | Appl. No. | 749,809 |
| [22] | Filed | Aug. 2, 1968 |
| [45] | Patented | July 27, 1971 |
| [73] | Assignee | Olympus Opitcal Co., Ltd. |
| | | Tokyo, Japan |
| [32] | Priority | Aug. 8, 1967, Aug. 8, 1967, Aug. 8, 1967, Aug. 8, 1967, Aug. 29, 1967 |
| [33] | | Japan |
| [31] | | 42/50507, 42/50508, 42/50510, 42/50511 and 42/73425 |

[54] DEVICE FOR MEASURING THE DISTANCE OF AN OBJECT FROM THE FORWARD END PORTION OF AN ENDOSCOPE
7 Claims, 5 Drawing Figs.

| [52] | U.S. Cl. | 128/6, 33/71, 356/3 |
| --- | --- | --- |
| [51] | Int. Cl. | A61b 1/06 |
| [50] | Field of Search | 128/4, 6; 33/47, 71; 356/1, 4, 5, 3 |

[56] References Cited
UNITED STATES PATENTS

| 2,316,751 | 4/1943 | Adler | 33/71 X |
| 3,270,641 | 9/1966 | Gosselin | 95/11 |

Primary Examiner—Richard A. Gaudet
Assistant Examiner—G F. Dunne
Attorney—Kurt Kelman ABSTRACT: Device for measuring the distance of an object from the forward end portion of an endoscope adapted to be inserted into a hollow portion of a living body or the like for the inspection thereof. The forward end portion is connected to a control housing through an elongated tube. The image of an object is formed in the forward end portion by an objective lens system provided therein on the image is transmitted through the elongated tube so as to be viewed through an ocular means provided in the control housing. In order to determine the distance between the object and the forward end portion of the endoscope, a thin parallel light beam is emitted from the forward end portion toward the object so as to form a light spot thereon.

The distance of the object from the forward end portion of the endoscope is determined by measuring the position of the light spot with respect to the field of view of the endoscope of by measuring the amount of the operation for changing the direction of the thin parallel light beam so as to bring the light spot appearing in the field of view into registration with a predetermined index mark set in the field of view due to the fact that the position of the light spot with respect to the field of view of the endoscope varies as the distance between the object and the forward end portion of the endoscope varies.

PATENTED JUL 27 1971

3,595,220

INVENTOR
ICHIZO KAWAHARA
BY Kurt Kelman
AGENT

DEVICE FOR MEASURING THE DISTANCE OF AN OBJECT FROM THE FORWARD END PORTION OF AN ENDOSCOPE

BACKGROUND OF THE INVENTION

The present invention relates to a device for measuring the distance of an object from the forward end portion of an endoscope adapted to be inserted into a hollow portion of a living body or the like for the inspection thereof.

In using an endoscope, it is necessary to successively or intermittently observe an object such as a part of a hollow portion of a living body to be inspected in order to find out how the portion to be inspected changes as the time elapses by comparing the results of the inspection with those obtained in the previous inspections. In comparing the results of the inspection with those obtained by the previous inspections, it is necessary to accurately find out the distance between the object and the forward end portion of the endoscope in order to exactly determine the actual dimension of the object or the actual dimension of the field of view so that correct judgement on the development of the object which will vary in size as the time elapses.

Heretofore, the amount of the adjustment of focus of the objective lens system of the endoscope for sharply focusing the object is utilized to assume the distance between the object and the forward end portion of the endoscope. However, since a wide angle objective lens system having a relatively greater depth of focus is incorporated in the endoscope, the exact adjustment of the focus is very difficult thereby lowering the accuracy of the inspection.

By another method, a light beam having a predetermined high quantity is emitted from the forward end portion of the endoscope so as to illuminate the object and the light reflected from the object is received by a sensing means provided in the forward end portion of the endoscope so that the intensity of the reflected light is converted into an electrical value from which the distance between the object and the forward end portion of the endoscope is estimated. However, the reliability of this method for determining the distance is relatively low because the angle formed between the optical axis of the objective lens system and the normal to the surface of the object tends to vary each time the inspection is effected by the endoscope thereby resulting in the variation in the light quantity received by the sensing means depending upon the change in the angle between the optical axis and the normal referred to above.

SUMMARY OF THE INVENTION

One object of the present invention is to provide a novel and useful device for measuring the distance between an object and the forward end portion of an endoscope adapted to be inserted into a hollow portion of a living body or the like for the inspection thereof. In principle, the present invention utilizes one or two thin parallel light beams emitted from the forward end portion of the endoscope toward the object. The thus emitted thin parallel light beam or beams form bright light spot or spots on the surface of the object and the thus formed light spot or spots are viewed through the endoscope together with the image of the object. The position of the light spot with respect to the field of view obtained by the endoscope or the relative positions of the light spots with respect to the field of view varies as the distance between the object and the forward end portion of the endoscope varies. Therefore, the distance between the object and the forward end portion of the endoscope is determined on the basis of the position of the light spot or spots with respect to the field of view of the endoscope as measure by means of graduations in the focal plane of the ocular means or by means of movable index mark in the focal plane of the ocular means controlled by a control mechanism provided in the control housing.

Alternatively, the direction of the thin parallel light beam or beams can be controlled by operating a control mechanism provided in a control housing of the endoscope connected to the forward end portion through an elongated tube preferably an elongated flexible tube the flexure of which is controlled by means of a control means provided in the control housing. When the direction of the thin parallel light beam or beams is changed, the position of the light spot or spots formed on the surface of the object are varied. Thus, when the light beam is brought into registration with a stationary mark in the focal plane of the ocular means or some other focal plane of the viewing optical system of the endoscope or when the two light spots are brought into registration with each other or into a predetermined relation with respect to the field of view, the distance between the object and the forward end portion of the endoscope is determined on the basis of the amount of the operation of the control mechanism.

In an endoscope having variable magnification varying objective lens system, the measurement of the actual dimension of emitted field of view of the endoscope is achieved in accordance with the present invention by providing a differential mechanism which is adapted to actuate the indicating means for indicating the actual dimension of the field of view and which differentially couples the focus adjusting means or the distance-measuring means the amount of the operation thereof being indicative of the distance between the object and the forward end portion of the endoscope with the magnification-varying means of the objective lens system the amount of the operation thereof being indicative of the variation in the magnification power of the objective lens system. light-reflecting Thus, the effect of the variation in the magnification power of the objective lens system is compensated for in order to permit the indicating means to be correctly indicate the actual dimension of the field of view of the endoscope regardless of the variation in the magnification power of the objective lens system.

The other features of the present invention will be apparent from the following description of the preferred embodiments of the present invention with reference to the accompanying drawings.

DETAILED DESCRIPTION OF THE PREFERRED EMBODIMENTS

Figure 1:
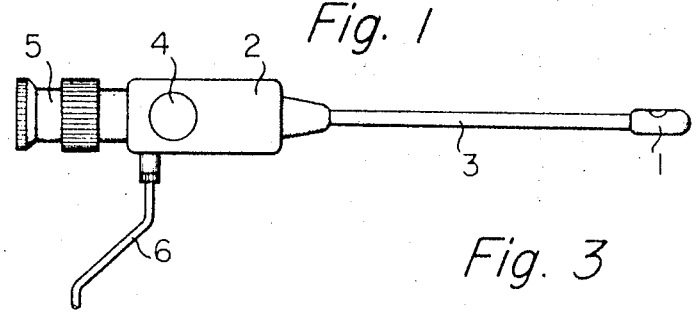
FIG. 1 is a general side view of an endoscope incorporating the first embodiment of the present invention.
Figure 2:
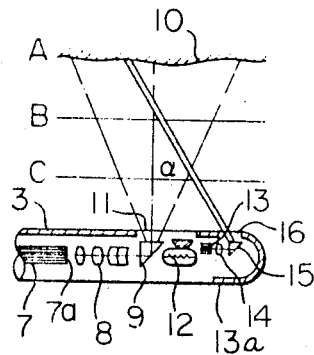
FIG. 2 is a fragmentary longitudinal cross-sectional view showing the forward end portion of the endoscope shown in FIG. 1.
Figure 4:
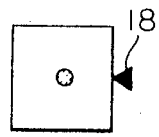
FIGS. 4 and 5 show, respectively, a movable index mark provided in the focal plane of the ocular means of the endoscope for indicating the distance of the object from the forward end portion of the object by bringing the index mark into registration with the light spot appearing in the field of view.

Referring to the drawings, FIGS. 1 and 2 show a first embodiment of the device for measuring the distance between the object and the forward end portion of the endoscope constructed in accordance with the present invention.

In FIG. 1, the endoscope shown comprises a forward end portion 1 connected to a control housing 2 through an elongated tube 3 preferably an elongated flexible tube. The control housing 2 is provided with a focus-adjusting means 4, an ocular means 5, an electric power supplying lead wires 6 and preferably control means (not shown) for effecting the bending said elongated tube 3. As seen in FIG. 2, an image-transmitting optical system 7 such as a fiber optical system extends through the elongated tube 3 from the control housing 2 to the forward end portion 1 of the endoscope. An objective lens system 8 is provided in the forward end portion 1 in front of the forward end 7a of the image-transmitting optical system 7 in the optical axis thereof, and a light reflecting means 9 such as a prism is located in front of the objective lens system 8 in the optical axis of the forward end of the image-transmitting optical system 7 so that the light from an object 10 incident to the light-reflecting means 9 through a window 11 provided in the wall of the forward end portion 1 is reflected by the light-reflecting means 9 toward and through the objective lens system 8 so as to be focused onto the forward end 7a of the image-transmitting optical system 7 to form an image of the object thereon. The image formed on the forward end 7a of the image-transmitting optical system 7 is transmitted therethrough to the rearward end thereof. The rearward end of the image-transmitting optical system 7 is located in the control housing in front of the ocular means 5 thereby permitting the thus transmitted image of the object to be viewed through the ocular means 5. The adjustment of the focusing of the objective lens system can be effected by means of the focus adjusting means.

A light source 12 such as a lamp is located in the forward end portion 1 and energized by an external power source through lead wires extending from the control housing 2 through the elongated tube 3 so as to illuminate the object through the window 11. The light source 12 may be replaced by a light-conducting fiber optical system extending through the elongated tube 3 from the control housing 2 to the forward end portion 1. In this case, the rearward end of the light conducting fiber optical system adjacent to or in the control housing 2 is illuminated by an external light source, and the light transmitted through the light-conducting fiber optical system to the forward end thereof is emitted therefrom toward the object.

In accordance with one of the features of the present invention, a light-projecting means is provided in order to measure the distance between the object 10 and the forward end portion 1 of the endoscope. The light-projecting means comprises a fiber optical system 13 extending from the control housing 2 through the elongated tube 3 to the forward end portion 1, a collimating lens system 14 located in front of the forward end 13a of the fiber optical system 13 in the optical axis thereof and a light-reflecting means 15 such as a prism located in front of the light-reflecting means 14 in the optical axis thereof. The rearward end of the fiber optical system 13 adjacent to or in the control housing 2 is illuminated by an external light source (not shown) so that the light is transmitted through the fiber optical system 13 to the forward end 13a thereof so as to be emitted therefrom. The light emitter from the forward end 13a of the fiber optical system 13 is collimated by the collimating lens system 14 to form a thin parallel light beam and reflected by the light-reflecting means 15 toward the object 10 through a window 16 provided in the wall of the forward end portion 1 and spaced a certain distance from the optical axis extending from the light-reflecting means 9 of the objective lens system 8 to the object 10. The direction of the thus reflected thin parallel light beam directed toward the object 10 is so determined that the light beam is directed within the field of view available by the objective lens system 8 and preferably crosses the optical axis extending between the light reflecting means 9 and the object 10 at an angle $\alpha$. The angle $\alpha$ is preferably made as great as possible as shown in FIG. 2.

Thus, the thin parallel light beam incident to the object 10 from the light-reflecting means 15 forms a small light spot on the surface of the object 10 which is viewed through the viewing optical system comprising the light-reflecting means 9, the objective lens system 8, the image-transmitting optical system 7 and the ocular means 5 together with the field of view available by the objective lens system 8.

Figure 3:
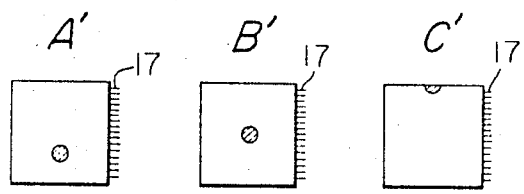
FIG. 3 shows the various positions of the light spot formed in the field of view of the endoscope shown in FIG. 2.

Graduations 17 are provided in the focal plane of the ocular means 5 as shown in FIG. 3. The location of the graduations 17 is so determined that it extends in the direction corresponding to the location of the plane including the optical axis extending from the light-reflecting means 9 to the object 10 and the thin parallel light beam reflected to the object 10 from the light-reflecting means 15 as viewed through the ocular means 15.

Therefore, when the distance between the object 10 and the forward end portion 1 of the endoscope is varied, for example, from A, B to C as shown in FIG. 2, then the position of the light spot formed by the thin parallel light beam on the surface of the object 10 as viewed through the ocular means 5 varies as indicated by A', B' and C' in FIG. 3 with respect to the field of view available by the objective lens system 8, thereby permitting the position of the light spot to be read out by means of the graduations 17. Thus, the distance between the object 10 and the forward end portion 1 can be determined by the medium of the graduations 17 provided in the focal plane of the ocular means 5.

Figure 5:
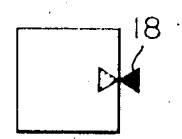

Alternatively, a movable index mark 18 may be provided in place of the graduations 17 so that the index mark 18 or the image thereof formed by a conventional optical system is moved in the focal plane of the ocular means 5 by means of a control mechanism (not shown) provided in the control housing 2. The movement of the index mark 18 is controlled by the control mechanism so that the index mark 18 is brought into registration with the light spot as viewed in the focal plane of the ocular means 5. Thus, the distance of the object 10 from the forward end portion 1 is determined on the basis of the amount of the operation of the control mechanism for bringing the index mark 18 into registration with the light spot. To this end, an indicating means may be provided in the control housing which indicates the amount of the operation of the control mechanism in terms of the distance of the object 10 from the forward end portion 1 of the endoscope. In this case, the configuration of the light spot is preferably made in the form having a sharp apex which is directed against the index mark 18 as shown in FIG. 5 so as to permit the index mark 18 to be conveniently and exactly brought into registration with the light spot.

In accordance with the other feature of the present invention, the light-reflecting means 15 can be rotated by the operation of a control mechanism (not shown) provided in the control housing 2 through string means extending through the elongated tube 3 and operatively connecting the light-reflecting means 15 to the control mechanism so that the direction of the thin parallel light beam reflected by the light-reflecting means 15 toward the object 10 is varied in the plane including the optical axis of the light-reflecting means 9 toward the object 10 so as to bring the light spot formed thereby on the surface of the object 10 as viewed in the focal plane of the ocular means 5 into registration with a stationary mark similar in shape to the index mark 18 and provided in the focal plane of the ocular means 5 as the distance of the object 10 from the forward end portion 1 is varied. Thus, the distance between the object 10 and the forward end portion 1 can be determined on the basis of the amount of the operation of the control mechanism for bringing the light spot on the surface of the object 10 as viewed in the focal plane of the ocular means 5 into registration with the stationary mark. An indicating means may be provided in the control housing 2 in like manner as described above.

In the above embodiments, the light projecting means is shown as comprising a fiber optical system 13. However, within the scope of the present invention, the fiber optical system 13 may be replaced by a lamp provided in the forward end portion 1 and energized by an external power source through lead wires extending from the control housing 2 through the elongated tube 3. In this case, the light-reflecting means 15 can be omitted by locating the lamp and the collimating lens system so as to limit the thin parallel light beam toward the object.

Also, any type of the image-transmitting optical systems such as those used in the prior art endoscope such as esophagoscope and brouchoscope may be used in place of the fiber optical system 7 as shown in FIG. 2.

Further, in the embodiments shown, the endoscope is shown as a side-viewing endoscope for inspection of an object end portion. However, it is apparent that the present invention may also be incorporated in a front-viewing endoscope by which an object located in front of the forward end portion of the endoscope is inspected.

Further, the endoscope incorporating the present invention may be provided with a photographing means in the forward end portion of the endoscope which is or is not provided with an automatic exposure control mechanism. FIGS. 6 and 7 show another embodiment of the present invention.

I claim:

1. Device for measuring the distance of an object from the forward end portion of an endoscope adapted to be inserted into a hollow portion of a living body or the like for the inspection thereof, said endoscope comprising a control housing connected to said forward end portion through an elongated tube, an image-transmitting optical system such as a fiber optical system extending through said elongated tube so as to transmit an image of the object formed in said forward end portion by an objective lens system provided therein through said image-transmitting optical system to said control housing thereby permitting the thus transmitted image to be viewed through ocular means provided in said control housing, a light-projecting means adapted to emit a thin parallel light beam from said forward end portion of the endoscope a certain distance spaced from said objective lens system in the field of view available by the endoscope so as to form a light spot on the surface of the object inspected through the endoscope, and readout means provided in said control housing for reading out the position of said light spot with respect to the field of view inspected through the endoscope thereby permitting the distance of the object from the forward end portion of the endoscope to be determined on the basis of the thus read out position of the light spot, wherein said readout means comprises a movable indexing mark visible through said ocular means together with the field of view, said movable indexing mark being moved by operating a control mechanism provided in said control housing so that the position of said indexing mark is brought into registration with the light spot on the surface of the object as viewed through said ocular means thereby permitting the distance of the object from the forward end portion of the endoscope to be determined on the basis of the amount of the operation of said control mechanism for bringing said indexing mark into registration with said light spot.

2. Device according to claim 1 wherein the endoscope is a side-viewing endoscope adapted to inspect an object located at the side of said forward end portion of the endoscope substantially laterally of the longitudinal axis thereof, and said light-projecting means is adapted to emit the thin parallel light beam substantially laterally of the longitudinal axis of said forward end portion toward the object.

3. Device according to claim 2 wherein said light-projecting means comprises a fiber optical system extending from said control housing through said elongated tube into said forward end portion of the endoscope with the end thereof adjacent to said control housing being illuminated by an external light source to thereby transmit the light through said fiber optical system to the forward end thereof, a collimating lens system located in front of said forward end of said fiber optical system, and light-reflecting means located in front of said collimating lens system so that the thin parallel light beam is emitted from said forward end portion substantially laterally of the longitudinal axis thereof.

4. Device for measuring the distance of an object from the forward end portion of an endoscope adapted to be inserted into a hollow portion of a living body or the like for the inspection thereof, said endoscope comprising a control housing connected to said forward end portion through an elongated tube, an image-transmitting optical system such as a fiber optical system extending through said elongated tube so as to transmit an image of the object formed in said forward end portion by an objective lens system provided therein through said image-transmitting optical system to said control housing thereby permitting the thus transmitted image to be viewed through ocular means provided in said control housing, a light-projecting means adapted to emit a thin parallel light beam from said forward end portion of the endoscope a certain distance spaced from said objective lens system in the field of view available by the endoscope so as to form a light spot on the surface of the object inspected through the endoscope, and readout means provided in said control housing for reading out the position of said light spot with respect to the field of view inspected through the endoscope thereby permitting the distance of the object from the forward end portion of the endoscope to be determined on the basis of the thus readout position of the light spot, wherein said readout means comprises a stationary index mark visible through said ocular means and the direction of the thin parallel light beam emitted from said light-projecting means is controllable by the operation of a control mechanism provided in said control housing so that the light spot on the surface of the object as viewed through said ocular means is brought into registration with said stationary index mark of said readout means thereby permitting the distance of the object from the forward end portion of the endoscope to be determined on the basis of the amount of the operation of said control mechanism for bringing the light spot into registration with the stationary index mark.

5. Device according to claim 4 wherein the endoscope is a side-viewing endoscope adapted to inspect an object located at the side of said forward end portion of the endoscope substantially laterally of the longitudinal axis thereof, and said light projecting means is adapted to emit the thin parallel light beam substantially laterally of the longitudinal axis of said forward end portion toward the object.

6. Device according to claim 4 wherein the endoscope comprises a pair of light projecting means which emit the thin parallel light beams from the forward end portion of the endoscope substantially laterally of the longitudinal axis thereof at positions oppositely spaced a certain distance from the objective lens system, respectively, so as to form two light spots on the surface of the object inspected through the endoscope thereby permitting the distance of the object from the forward end position of the endoscope to be determined on the basis of the positions of said two light spots relative to each other with respect to the field of view of the endoscope as viewed in the focal plane of said ocular means and read out by said readout means.

7. Device according to claim 4 wherein said light projecting means comprises a fiber optical system extending from said control housing through said elongated tube into said forward end portion of the endoscope with the end thereof adjacent to said control housing being illuminated by an external light source to thereby transmit the light through said fiber optical system to the forward end thereof, a collimating lens system located in front of said forward end of said fiber optical system, and light-reflecting means located in front of said collimating lens system so that the thin parallel light beam is emitted from said forward end portion substantially laterally of the longitudinal axis thereof.